United States Patent
Lorentz et al.

(10) Patent No.: US 9,927,277 B1
(45) Date of Patent: Mar. 27, 2018

(54) PLASTIC BODY METER RESETTER

(71) Applicant: John C. Kupferle Foundry Company, St. Louis, MO (US)

(72) Inventors: Daniel C. Lorentz, St. Louis, MO (US); Bruce A. Manning, Waterloo, IL (US)

(73) Assignee: John C. Kupferle Foundry Company, St. Louis, MO (US)

( * ) Notice: Subject to any disclaimer, the term of this patent is extended or adjusted under 35 U.S.C. 154(b) by 0 days.

(21) Appl. No.: 15/071,715

(22) Filed: Mar. 16, 2016

Related U.S. Application Data

(60) Provisional application No. 62/307,011, filed on Mar. 11, 2016, provisional application No. 62/133,557, filed on Mar. 16, 2015.

(51) Int. Cl.
*E03B 7/07* (2006.01)
*F16L 55/07* (2006.01)
*G01F 15/18* (2006.01)

(52) U.S. Cl.
CPC ............ *G01F 15/185* (2013.01); *E03B 7/072* (2013.01); *F16L 55/07* (2013.01)

(58) Field of Classification Search
CPC ........ E03B 7/072; E03B 7/095; G01F 15/185; G01F 15/18; F16L 55/07
See application file for complete search history.

(56) References Cited

U.S. PATENT DOCUMENTS

| | | | | |
|---|---|---|---|---|
| 654,615 A | * | 7/1900 | Estill | G01F 15/185 285/123.1 |
| 1,988,003 A | * | 1/1935 | Ford | G01F 15/18 285/122.1 |
| 2,489,660 A | * | 11/1949 | Mueller | G01F 15/185 285/30 |
| 2,576,630 A | * | 11/1951 | Mueller | F16L 3/00 285/122.1 |
| 2,748,800 A | * | 6/1956 | Allen | G01F 15/185 137/599.13 |

(Continued)

OTHER PUBLICATIONS

The Kupferle Foundry Company, "MainGuard #94WM Sampling Station" advertisement and diagram of Model #94WM, Mar. 8, 2008, 2 pages, St. Louis, MO.

(Continued)

*Primary Examiner* — Kevin Lee
(74) *Attorney, Agent, or Firm* — Polster Lieder Woodruff & Lucchesi, L.C.

(57) ABSTRACT

A water meter resetter incorporates as a principal component a plastic body having six fittings lying in a common plane. A primary inlet and primary outlet are coaxially aligned on first and second opposed walls. A secondary outlet and secondary inlet are coaxially aligned on the opposed walls. In use, a first horn is rotatably attached to the secondary outlet, and a second horn is rotatable attached to the secondary inlet. A water meter is attached between the horns. Because the horns are rotatable about a common axis at each of their ends, the meter can be offset from the supply pipes at continuously variable heights. In an embodiment, the secondary inlet and outlet are internal, and the horns are held in a fluid-tight slip joint formed by internal O-rings. The height of the meter may optionally be locked by the use of an angle holder.

20 Claims, 6 Drawing Sheets

(56) References Cited

U.S. PATENT DOCUMENTS

| | | | | |
|---|---|---|---|---|
| 3,083,577 A | * | 4/1963 | Nelson et al. | G01N 1/2035 137/599.01 |
| 3,511,524 A | * | 5/1970 | Ford et al. | F16L 43/02 285/179 |
| 4,691,727 A | | 9/1987 | Zorb et al. | |
| 4,967,788 A | | 11/1990 | Miller | |
| 5,595,368 A | * | 1/1997 | Bogdany et al. | F16L 19/02 137/515 |
| 5,823,577 A | * | 10/1998 | Johnston | G01F 15/18 137/366 |
| 7,281,545 B2 | | 10/2007 | Hunt | |
| 8,109,297 B2 | | 2/2012 | Cimberio et al. | |
| 8,342,200 B1 | * | 1/2013 | Payne | B25B 27/00 137/15.03 |
| 2002/0096880 A1 | * | 7/2002 | Schulz et al. | F16L 55/07 285/133.11 |

OTHER PUBLICATIONS

A.Y. Mcdonald Mfg. Co., "Copper Meter Resetters" catalog, Nov. 2012, 16 pages.

A.Y. Mcdonald Mfg. Co., "Submittal Data Sheet—NL Meter Setter—720-307WXDD 33 Double Purpose X Double Purpose," Sep. 2014, 1 page, Dubuque, Iowa.

A.Y. Mcdonald Mfg. Co., "No-Lead Resetter Sampling Station" products webpage, Feb. 26, 2015, 2 pages.

A.Y. Mcdonald Mfg. Co., "No-Lead Series 710—Low Rise Resetter" products webpage, Feb. 26, 2015, 1 page.

\* cited by examiner

PLASTIC BODY METER RESETTER

CROSS-REFERENCE TO RELATED APPLICATIONS

This application is a non-provisional application of U.S. application Ser. No. 62/307,011, filed Mar. 11, 2016, and Ser. No. 62/133,557, filed Mar. 16, 2015, to both of which priority is claimed. The disclosures of both of these applications are hereby incorporated by reference.

STATEMENT REGARDING FEDERALLY SPONSORED RESEARCH

Not applicable.

BACKGROUND OF THE INVENTION

When water meters are installed or exchanged, it is often convenient or necessary to utilize a "resetter" to position the meter in a desired location (frequently above the position of the service pipes feeding the water user from the subterranean water main) or in a desired orientation. It is also frequently necessary to accommodate a meter of a different size than the original meter. Examples of such resetters are shown in Zorb, et al., U.S. Pat. No. 4,691,727, Miller, U.S. Pat. No. 4,967,788, Hunt, U.S. Pat. No. 7,281,545, and Cimberio et al., U.S. Pat. No. 8,109,297. Sets of similar resetters have been used which accommodate different meters, as shown for example in A.Y. McDonald Manufacturing Co.'s resetters, shown at www.aymcdonald.com and in its catalog "Copper Meter Resetters 11/12." It is also sometimes desirable to provide a tap in the resetter, in order to mount a sampling valve or other accessory. An example of such an arrangement is the Kupferle MainGuard™ Model 94WM. All of the references mentioned herein are hereby incorporated by reference.

All of these prior arrangements are somewhat cumbersome and expensive. Most require a separate device for each installation, custom made for a particular length and pipe size of the meter, for a particular orientation and positioning of the meter within a meter box, and for particular possible accessories. Such devices typically include a casting having axially aligned connections for the inlet pipe from the water main (often called the city or street side) and outlet pipe to the consumer (often called the house side), and axially aligned fittings for connection to the inlet and outlet of the meter. Two curved pipes, often called "horns," are soldered, brazed, or otherwise firmly and permanently fixed to the casting's fittings. The free ends of the horns have flared ends which retain nuts that are threaded onto male threaded fittings on the meter.

BRIEF SUMMARY OF THE INVENTION

In accordance with the present invention a water meter resetter is provided that permits easy and inexpensive customization for a variety of water meters and orientations.

In accordance with an embodiment, the resetter incorporates as a principal component a plastic body having six fittings lying in a common plane. A primary inlet and primary outlet are coaxially aligned on first and second opposed walls. A secondary outlet and secondary inlet are coaxially aligned on the opposed walls. The primary inlet is fluidly connected to the secondary outlet and the secondary inlet is fluidly connected to the primary outlet through passages in the plastic body. The primary inlet and the primary outlet have fittings adapted to connect respectively to a main supply pipe attached to a water main and a consumer supply pipe attached to a consumer's facility, such as a residence, business or production facility. In use, a first horn is rotatably attached to the secondary outlet, and a second horn is rotatable attached to the secondary inlet. A water meter is attached between the horns. Because the horns are rotatable about a common axis through their proximal ends connected to the body, the meter can be offset from the supply pipes at continuously variable heights.

In this embodiment, the plastic body preferably has a width of about two to eight inches, a length of about two to eight inches, and a depth of about one to three inches. In an embodiment, the width is about three to about six inches, the length about three to about five inches, and the depth about 1.25" to about 2.25". In an illustrative embodiment, the length is about 3.5" to about 4.5", the width is about 3.5" to about 5.5", and the depth is about 1.5" to about 2.0". It will be understood that the dimensions, particularly the depth of the body will be appropriate to the size of the pipe to which it is attached.

In an embodiment, the secondary inlet and outlet comprise female fittings, each having multiple interior O-ring seals. The horns are inserted into the fittings to form a water-tight slip fit, and the inlet and outlet of a water meter are connected to the free ends of the horns, using swivel nuts. When the horns are connected to the meter, the meter prevents the horns from pulling loose from the plastic body, although the meter can rotate around the body with the O-ring slip fit being the pivot.

An angle holder may be provided to lock the position of the horns with respect to the body at a desired angle. The angle holder preferably has a first part fixed with respect to the body, a second part fixed with respect to at least one of the rotatable horns, and a tightenable attachment between the first and second parts.

The angle holder may lock the horns at discrete angles, such as at 30° increments, or may lock the horns at any continuously variable angle.

In another embodiment, the secondary inlet and outlet comprise male fittings. In this embodiment, flanges and swivel nuts are provided at both ends of each horn. This arrangement also allows free positioning of the meter height relative to the plastic body until the swivel nuts are tightened.

In an embodiment, at least one of the opposed walls of the plastic body includes an offset, and the body is not symmetrical. This simulates the shape of many standard resetters which accommodate a backflow-preventing check valve in-line with one of the primary fittings.

The fifth and sixth body fittings are positioned in a wall of the plastic body essentially at right angles to the opposed walls and first through fourth fittings. In an embodiment, the fifth and sixth fittings are internally threaded fittings. If desired, both the fifth and sixth fittings may be capped. In embodiments, however, an adapter is threaded into the fifth fitting to provide a seat and access point for a sampling valve. In other embodiments, other accessories may be attached to the fifth or sixth fitting, such as pressure relief valves, and various sensors and/or transducers for sensing or reporting such conditions of the meter and of the water flowing through it as pressure, temperature, turbidity, disinfectant levels, and contaminant levels.

The body is preferably made of a potable-water grade polyvinyl chloride (PVC), illustratively chlorinated polyvinyl chloride (CPVC). The passages in the body may be formed by boring, or they may be molded into the body, or they may be cast or molded into two halves of the body and the two halves glued or welded together, as by ultrasonic or friction welding, or the entire body may be formed digitally, as by 3D printing.

It will be appreciated that devices other than water meters may be set with the resetter of the invention. It will also be appreciated that the plastic body may be formed of other plastics. In broader aspects of the invention, the body may be formed of other materials, such as metals or ceramics.

Because the horns are independent of the plastic body, they may be of different materials, lengths, and shapes, depending on circumstances such as local codes, meter size, expected conditions of use, type and size of meter or other device being installed, and available space. Conventional meter resetters must have horns that can be soldered to the, usually brass, body of the resetter, and so must be of compatible materials that do not create a galvanic cell. The horns of the present invention, in some embodiments, need touch only resilient o-rings, and in others only resilient washers (gaskets) and swivel nuts. To allow the horns to be made of other materials, such as stainless steel, without fear of galvanic corrosion, the swivel nuts may also be plastic. Individual horns are easily replaced without replacing the entire resetter.

Other aspects of the invention will be recognized by those skilled in the art in light of the following description, drawings, and claims.

DESCRIPTION OF THE PREFERRED EMBODIMENTS

Figure 1:
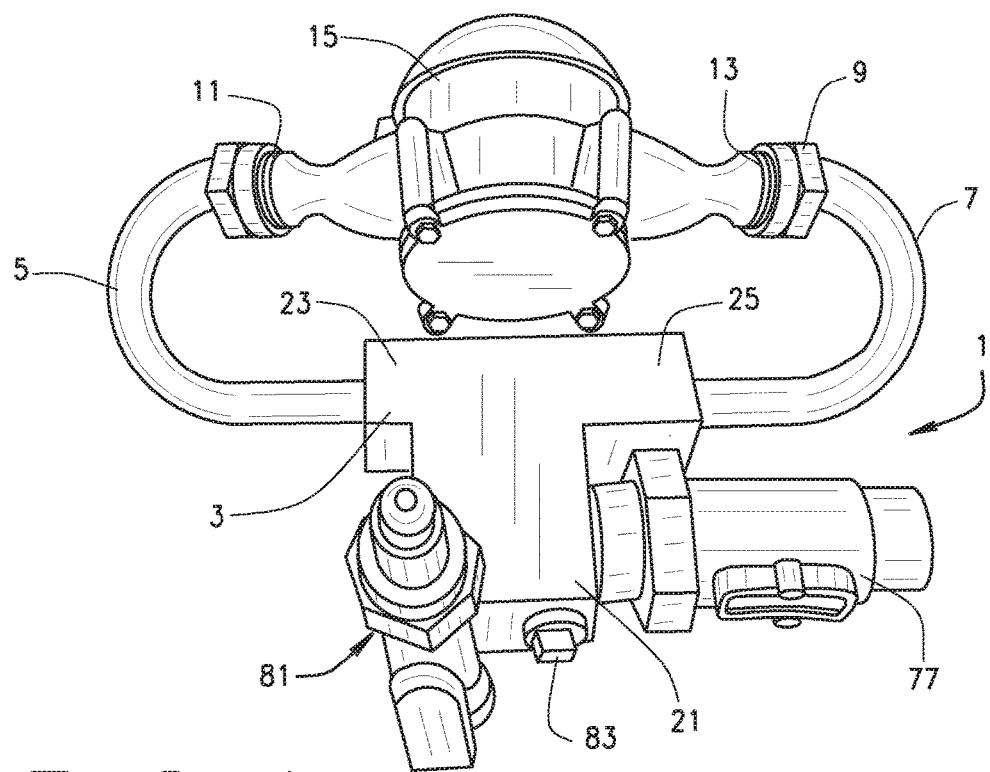
FIG. 1 is a view in front top perspective of a meter resetter in accordance with an embodiment of the invention, shown with a meter, a backflow preventing valve, and a sampling valve installed.

Referring now to the drawings for illustrative embodiments of the resetter of the present invention, FIGS. 1-8 show an embodiment of a resetter 1 in accordance with the present invention. As shown in FIGS. 1, 3-5, and 8, the resetter 1 includes a plastic body 3 having smooth ends of horns 5 and 7 inserted into the body 3. The flanged free ends of the horns 5 and 7 are held by swivel nuts (meter nuts) 9 to male fittings 11 and 13, respectively, of a water meter 15.

The plastic body 3 is cast as a block of potable-water grade PVC. The block has a length of about four inches, a width of about five-and-a-quarter inches, and a depth of about one-and-a-half inches. The block is illustratively formed as a solid T, having a stem 21, a shorter arm 23, and a longer arm 25.

Figure 4:
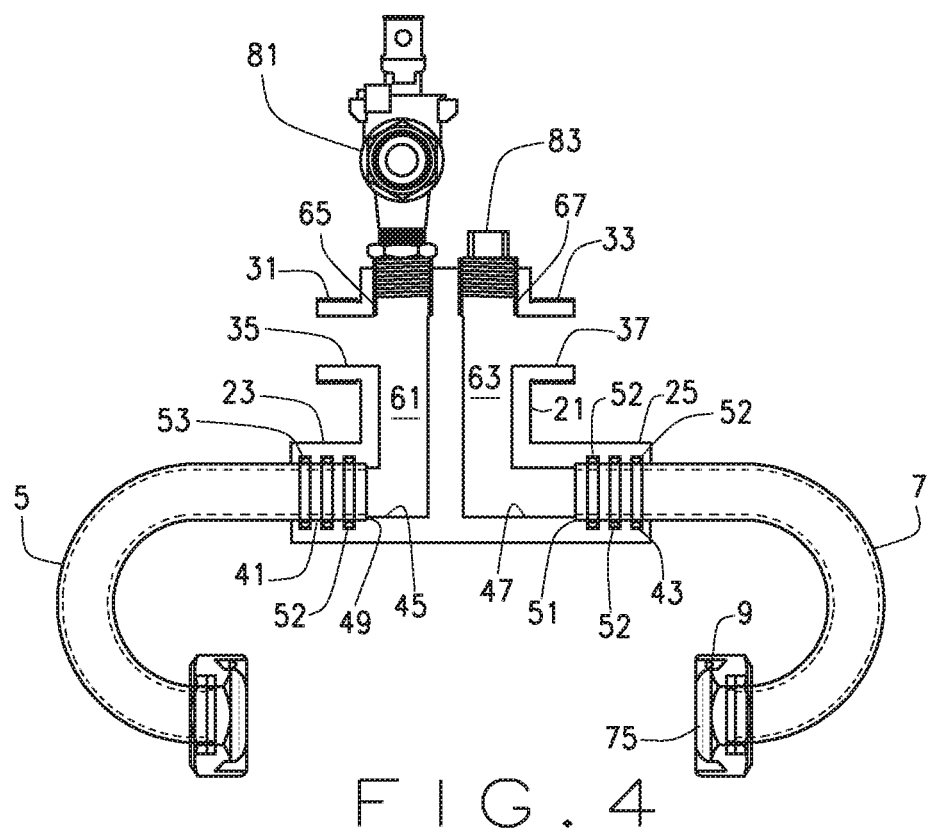
FIG. 4 is a top plan view, partially in section, of the meter resetter of FIG. 3, with the horns rotated 90°.

As best shown in FIG. 4, each side of the stem 21 of the T is provided with a threaded male fitting, forming a primary inlet 31 and a primary outlet 33. The fittings 31 and 33 are bored to form a primary inlet passage 35 and a primary outlet passage 37. The fittings 31 and 33 are axially aligned, and the primary inlet and outlet passages 35 and 37 are illustratively axially aligned.

The shorter arm 23 is provided with a female secondary outlet fitting 41, and the longer arm 25 is provided with a female secondary inlet fitting 43. The fittings 41 and 43 are bored to form a secondary outlet passage 45 and a secondary inlet passage 47. The fittings 41 and 43 and passages 45 and 47 are all coaxial. Passages 45 and 47 are counterbored to form annular shoulders 49 and 51 respectively. Outboard of the shoulders 49 and 51, each secondary inlet is machined with three internal annular grooves 52, each, sized to hold a "211" O-ring 53 (see FIG. 4). As is well known in the art, a "211" O-ring has a nominal inner diameter of 13/16", a nominal cross-sectional diameter of 1/8", and a nominal outer diameter of 1 1/16", and actual ID of 0.796"+/−0.010" and an actual cross-sectional diameter of 0.139"+/−0.004".

A main-side passage 61 is bored through the base of the stem 21 perpendicular to, and intersecting with, the passages 35 and 45, to form a fluid passage between the primary inlet 31 and the secondary outlet 41. A user-side passage 63 is bored through the base of the stem 21 perpendicular to, and intersecting with, the passages 37 and 47, to form a fluid passage between the secondary inlet 43 and the primary outlet 33. The open ends of the passages 61 and 63 are internally threaded to provide a main-side access port 65 and a user-side access port 67, respectively.

Figure 2:
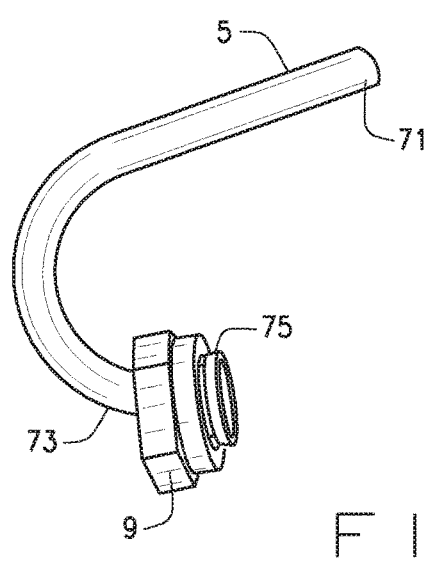
FIG. 2 is a top plan view of a horn portion of the meter resetter of FIG. 1.
Figure 3:
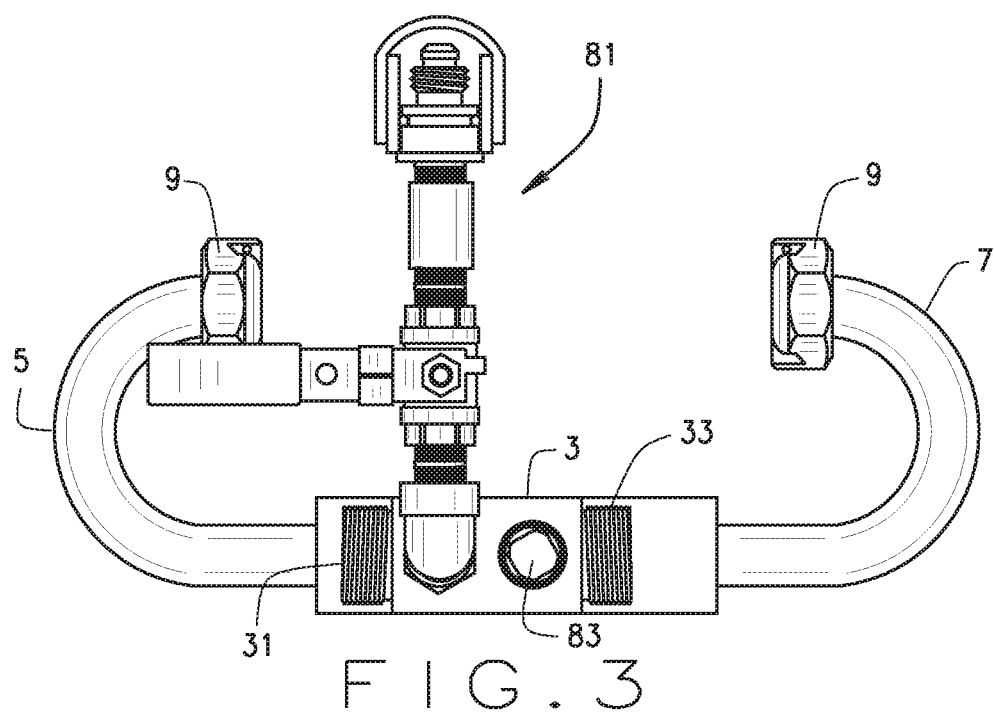
FIG. 3 is a view in front elevation of the meter resetter of FIG. 1, with the meter removed.

As best seen in FIG. 2, each horn 5 or 7 is formed as a J-shaped piece of tubing, illustratively of copper, having a smooth proximal end 71 sized to form a water-tight fit with the O-rings 53 and a distal end 73 having a flange 75 which retains the swivel nut 9.

A backflow-preventing check valve 77 is screwed onto the primary outlet 33. The check valve 77 may be an off-the-shelf dual check valve.

In use, the PVC body 3 and check valve 77 are mounted by swivel nuts to a main side and a user side of the installation (as shown in FIGS. 3-7 of Zorb, et al., U.S. Pat. No. 4,691,727), usually with the body in a level position, i.e., with the primary inlet 35 and outlet 37 and secondary outlet 45 and inlet 47 all lying in a generally horizontal plane. Because the arms 23 and 25 of the plastic block 3 are different lengths, horns 5 and 7 may be identical and still position the meter 15 in a useable position. This reduces the inventory of parts required and reduces the chance of reversing dissimilar horns.

The proximal ends 71 of the horns 5 and 7 are then pushed into the secondary outlet and inlet fittings 41 and 43 until they seat on shoulders 49 and 51, respectively, forming a water-tight seal with the O-rings 53 when the device is under water pressure. The meter 15 is then positioned between the distal ends 73 of the horns 5 and 7, pushing the horns out of their secondary seats a short distance to provide clearance. Elastomeric washers (not shown) are inserted between the male meter fittings and the flanges 75, and swivel nuts 9 are tightened to hold the meter in place. Because the spacing between the now-fixed distal ends of the horns 5 and 7 also sets the spacing between the proximal ends, the horns are held in the PVC block 3 when the meter is installed. Further, because the proximal ends of the horns are able to move axially in their secondary seats, the resetter allows for a small variation in the standard length of the meter 15. Before the swivel nuts 9 are fully tightened, the horns 5 and 7 are rotated to place the meter 15 at a desired height above the body 3, or even resting on the body 3.

Figure 5:
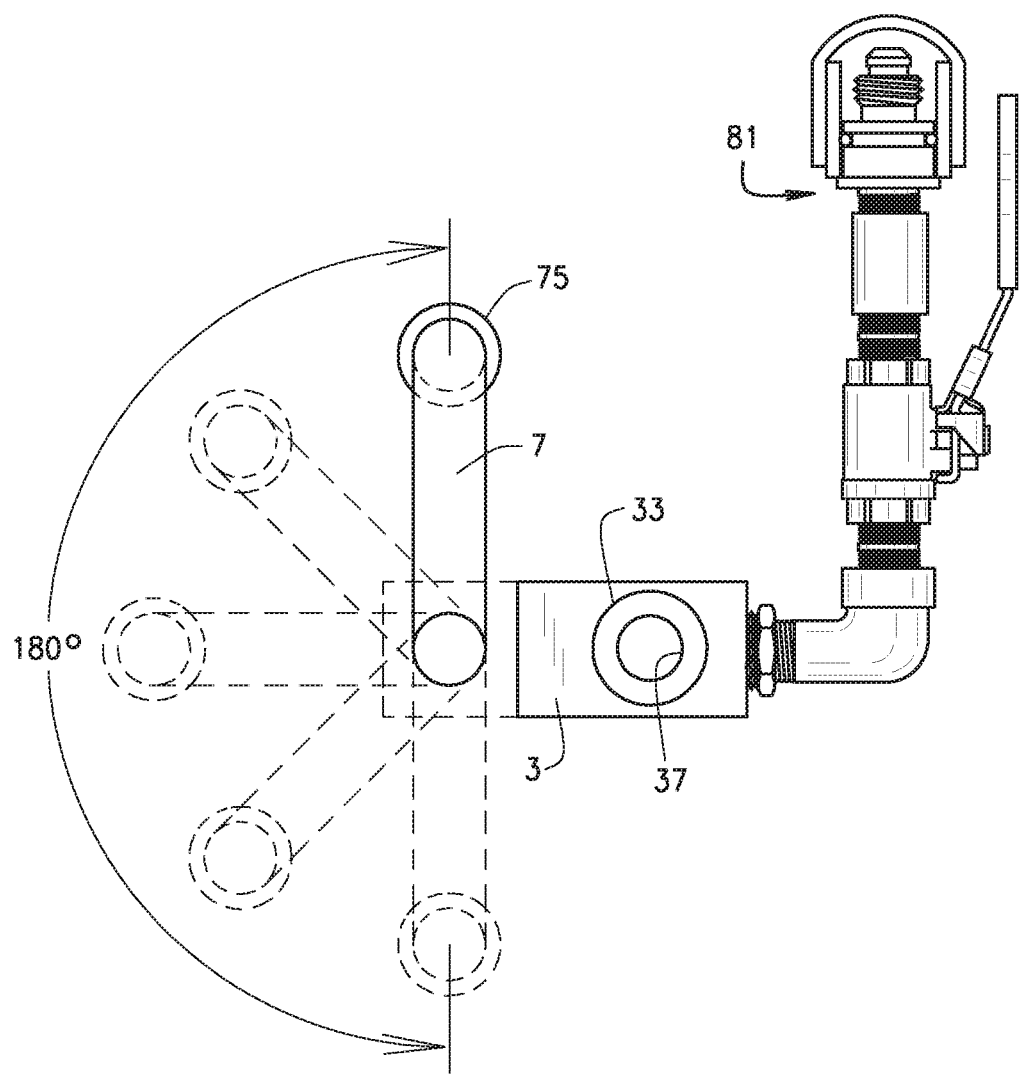
FIG. 5 is a view in right end elevation of the meter resetter of FIGS. 3 and 4, showing rotation of the horns of the resetter.

As shown in FIG. 5, the horns 5 and 7 may be rotated more than about 180° around the block 3 (about 300° or more, limited only by interference of the meter 15 with the sampling valve 81), allowing both the meter 15 and the block 3 to be oriented in essentially any desired rotational position. A meter resetter 1 in accordance with the present invention can therefore emulate various configurations that presently must be sold as separate, custom-made units with the horns soldered to a brass casting.

If desired, a sampling port 81 may be installed in the main-side access port 65, and a plug 83 installed in the user-side access port 67. The sampling port may be a standard design, such as sold by Kupferle Foundry as a part of its MainGuard #94WM sampling station, or by A.Y. McDonald Mfg., Co. as its No-Lead Resetter Sampling Station.

Figure 6:
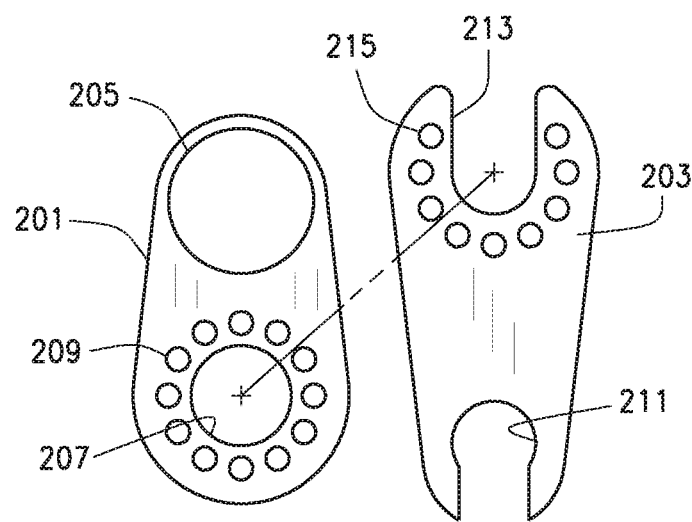
FIG. 6 is a view in front elevation of an angle holder for use with the meter resetter of FIGS. 1-5.
Figure 7:
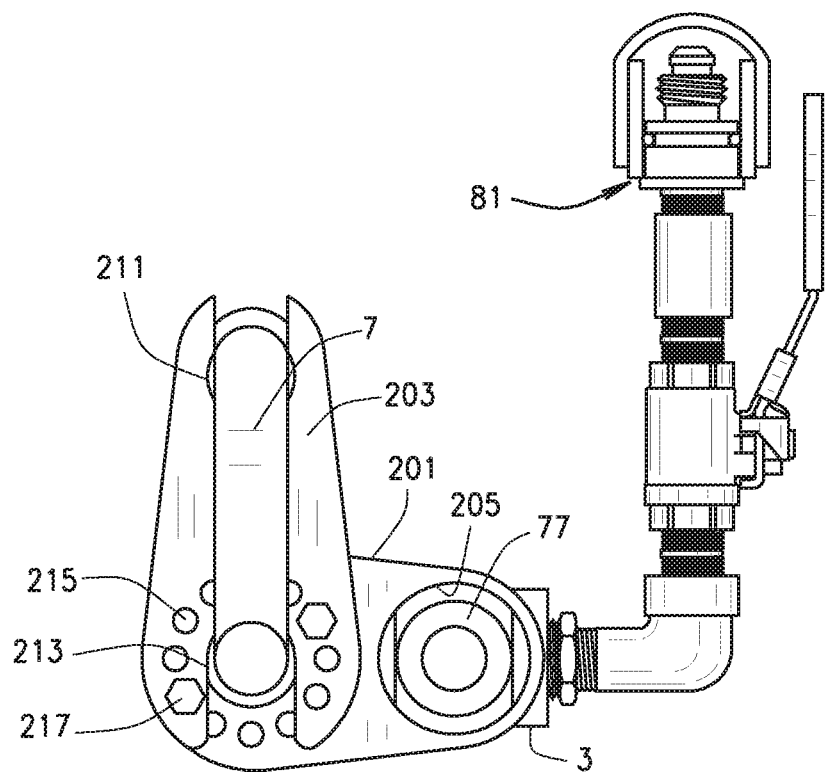
FIG. 7 is a view in right end elevation, corresponding to FIG. 5, of the meter resetter of FIGS. 1-5 with the angle holder of FIG. 6 attached.
Figure 8:
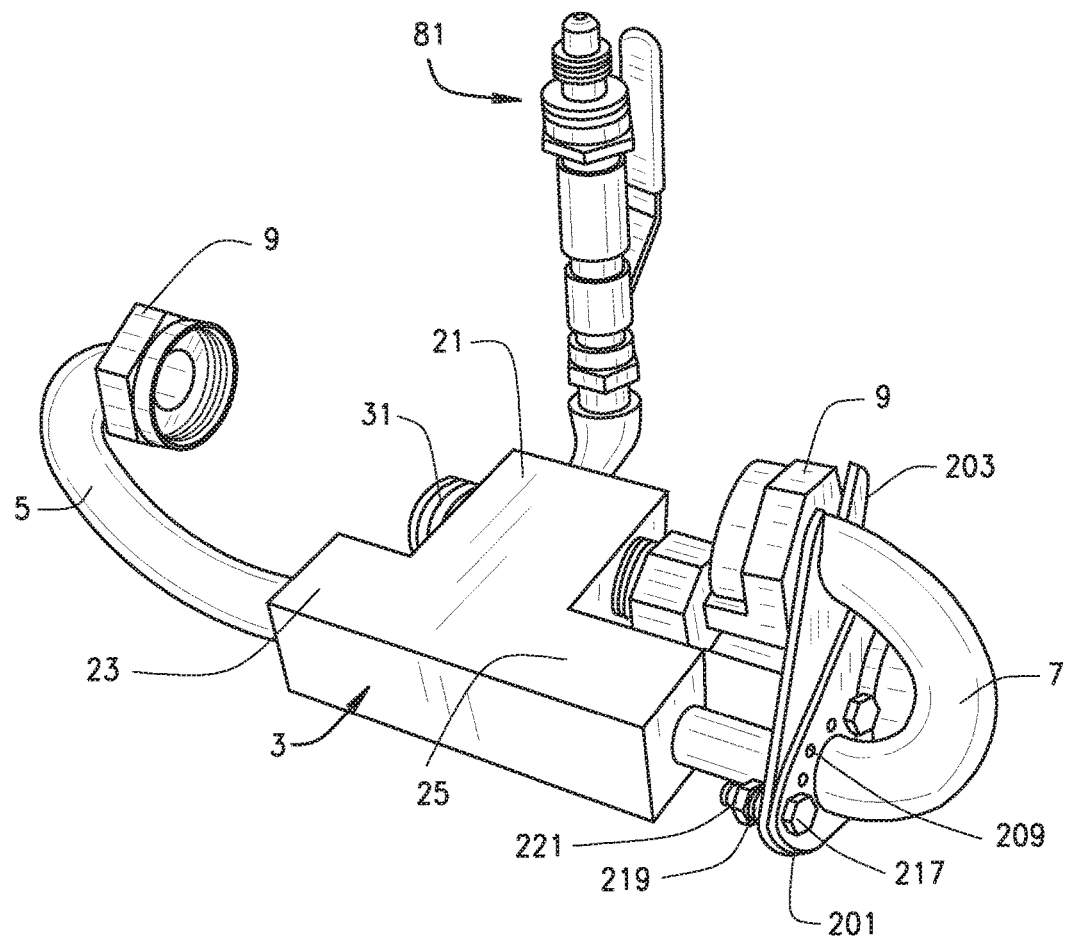
FIG. 8 is a view in rear perspective of the meter resetter of FIGS. 1-7, with the angle holder attached.

In some situations, it is desirable to fix the position (height) of the meter with respect to the primary inlet and outlet, i.e., the water service pipes, or otherwise to fix the position of the meter so it does not shift over time. In those situations, the position of the meter may be locked by the use of an angle holder, having a first part fixed with respect to the body and a second part fixed with respect to at least one of the rotatable horns, and a fixable attachment between the first and second parts. As shown in FIGS. 6-8, a simple embodiment of an angle holder for use with the embodiment of FIGS. 1-5 comprises two pieces 201 and 203 of rigid plastic sheet, illustratively PVC. The first piece 201 of the angle holder has a first opening 205 sized to fit over the check valve 77 and a second opening 207 sized to fit over the proximal end of horn 7 on the user side of the meter resetter. Twelve holes 209, at 30° spacings, surround the opening 207. The second piece 203 of the angle holder has a first, C-shaped, opening 211 at one end, sized to fit over the distal end of the horn 7, and a second, U-shaped, opening 213 at the other end, sized to fit over the proximal end of horn 7, overlying the first piece 201. Nine holes 215, at 30° spacings, surround the opening 213.

In use, the first opening 205 of the first piece 201 is slipped over the check valve 77, the opening 211 of the second piece 203 is slid over the distal end of the horn 7, the openings 207 and 213 are aligned, and the proximal end of horn 7 is slipped through them. Horn 7 is then rotated to a desired position, and bolts 217 are slipped through two aligned holes 209 and 215, and the pieces are secured with washers 219 and nuts 221, thereby fixing the rotational position of the horn 7 and the position of the meter 15.

If desired, all but one or two of the holes in one of the pieces may be eliminated to limit the available holes available for the bolt(s) 217. Likewise, if three holes are provided in that piece, spaced 40° apart, the rotation of the pieces cans be set in 10° increments. Alternatively, arcuate slots may be provided in one or both pieces of the angle holder in place of the holes 209 and 215, to give a broader range of available positions for the meter 15 at the expense of a positive stop. Two 30° slots in one piece will provide infinite heights for the meter.

Numerous variations in the meter resetter and body of the present invention, within the scope of the appended claims, will occur to those skilled in the art in light of the foregoing disclosure.

Figure 9:
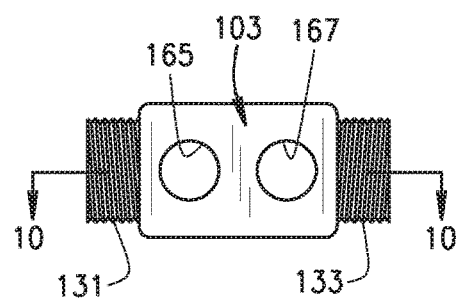
FIG. 9 is a view in bottom plan of another embodiment of meter resetter body of the present invention.
Figure 10:
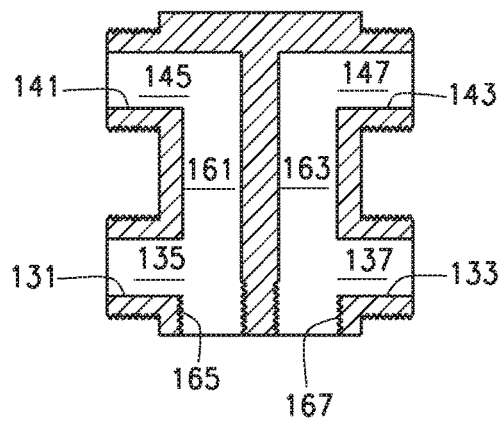
FIG. 10 is a sectional view of the meter resetter body of FIG. 9, taken along line 10-10 of FIG. 9.
Figure 11:
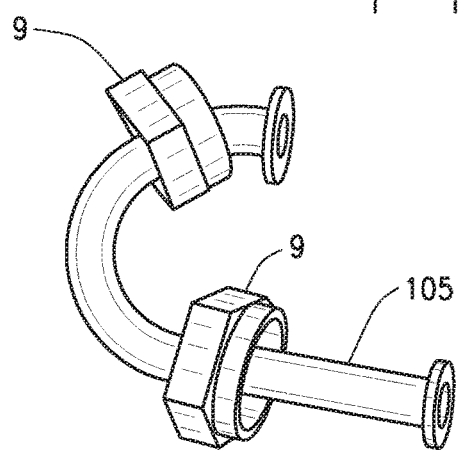
FIG. 11 is a top plan view of a horn for use with the meter resetter body of FIGS. 9 and 10.

Merely be way of example, rather than having female secondary outlet and inlet fittings, male fittings could be provided, as shown in FIGS. 9-11. In this embodiment 101, a PVC body 103 is provided with male primary inlet and outlet fittings 131 and 133 respectively, and male secondary outlet and inlet fittings 141 and 143 respectively. In this embodiment, the body 103 is symmetrical. As shown in FIG. 10, a primary inlet passage 135 and secondary outlet passage 145 are joined by a cross-passage 161, and a secondary inlet passage 147 and primary outlet passage 137 are joined by a cross-passage 163. The cross-passages 161 and 163 extend through a wall of the body 103 and are threaded internally to form access ports 165 and 167.

As shown in FIG. 11, the inlet horn 105 (and identical outlet horn, not shown), are formed with flanges on both ends, and with two swivel nuts 9 trapped between the flanges. The proximal flanged ends of the horns are held to the secondary outlet fitting 141 and secondary inlet fitting 143 respectively by swivel nuts 9, with elastomeric washers, not shown, between them. Until the swivel nuts 9 are fully tightened, the horns are free to rotate around the coaxial secondary fittings, allowing the meter 15 to be positioned as desired or as required by the installation. Once the nuts 9 are tightened, however, the distance between the distal ends of the horns is set, as is the case with a standard resetter. As with a standard resetter, the horns may be of different lengths, because of the symmetry of the block 103. As with the first embodiment of resetter of the invention, however, the horns are easily changed by loosening a nut if they are damaged or bent, or if a meter of different length is to be installed. As with the first embodiment, the horns are engaged by, and sealed to, an elastomeric element. This provides a slight resilience and adjustability to the resetter both during installation of the meter and after.

The body of the first embodiment, with internal secondary fittings, may be made symmetrical, with horns of different length.

Numerous other rotatable attachments may be used for mounting the horns to the body.

In all embodiments, the cross-bores corresponding to cross-bores 61 and 63 may extend through both end walls of the body, thereby providing four internally (or externally) threaded access ports, two on the main side of the meter and two on the user side of the meter. These access ports may be used for various types of monitoring, testing, and control devices. When not in use, these access ports would be plugged.

In all embodiments, the body may be made of other suitable materials, although PVC is presently preferred and confers advantages.

These variations are merely illustrative.

The invention claimed is:
1. A meter resetter comprising:
a body having a primary inlet, a primary outlet coaxial with the primary inlet, a secondary outlet, a secondary inlet coaxial with the secondary outlet, a first cross-passage forming a fluid connection between the primary inlet and the secondary outlet, a second cross-passage forming a fluid connection between the primary outlet and the secondary inlet and at least one access port forming a fluid connection between an exterior of the body and the first cross-passage; and a first J-shaped horn rotatably mounted to the secondary outlet and a second J-shaped horn rotatably mounted to the secondary inlet.

2. The meter resetter of claim 1 wherein the body is made of plastic.

3. The meter resetter of claim 2 wherein the plastic is PVC.

4. The meter resetter of claim 1 wherein the horns are mounted to a water meter.

5. The meter resetter of claim 1 wherein the body is asymmetrical and the horns are identical.

6. The meter resetter of claim 1 wherein the secondary outlet and secondary inlet comprise internal fittings having O-ring seals, the horns being rotatably and axially slidably mounted in the internal fittings.

7. The meter resetter of claim 1 wherein the secondary outlet and secondary inlet comprise external nipples having external threads, the horns being rotatably mounted to said secondary outlet and secondary inlet by swivel nuts.

8. The meter resetter of claim 1 further comprising a sampling valve mounted to said body, the sampling valve being in fluid communication with said primary inlet.

9. The meter resetter of claim 1 wherein the body is in the shape of a T, having a stem, a shorter arm, and a longer arm,
the primary inlet and primary outlet being formed on opposed sides of the stem and
the secondary outlet and secondary outlet being formed in ends of the arms.

10. The meter resetter of claim 9 wherein the secondary outlet is formed in the shorter arm.

11. The meter resetter of claim 10 wherein a sampling valve is mounted in a free end of the stem.

12. The meter resetter of claim 1 further comprising an angle holder constructed to lock an angular position of at least one of the horns with respect to the body.

13. The meter resetter of claim 12 wherein the angle holder comprises a first part fixed with respect to the body, a second part fixed with respect to at least one of the horns, and a connection between the first and second parts.

14. The meter resetter of claim 1 wherein the body is a block formed of a non-metallic material.

15. The meter resetter of claim 14 wherein the body block is formed of a plastic material.

16. The meter resetter of claim 1 further comprising at least a second access port forming a fluid connection between an exterior of the body and the second cross-passage.

17. The meter resetter of claim 16 further comprising a device mounted in the at least one or the second access port, the device being chosen from the group consisting of monitoring devices, testing devices, and control devices.

18. A meter resetter comprising a resetter body having
a primary inlet and a primary outlet coaxial with the primary inlet,
a secondary outlet in fluid communication with the primary inlet and a secondary inlet in fluid communication with the primary outlet, the secondary inlet being coaxial with the secondary outlet,
a first curved tube rotatably mounted in the secondary outlet and a second curved tube rotatably mounted in the secondary inlet, and
an angle holder to lock an angular position of at least one of the curved tubes with respect to the body, the angle holder comprising a first part fixed with respect to the body, a second part fixed with respect to at least one of the curved tubes, and an attachment between the first and second parts to hold the parts at a selected angle.

19. The meter resetter of claim 18 further comprising a meter connected between the first curved tube and the second curved tube.

20. A meter resetter comprising:
a resetter body having
a primary inlet and a primary outlet coaxial with the primary inlet,
a secondary outlet in fluid communication with the primary inlet and a secondary inlet in fluid communication with the primary outlet, the secondary inlet being coaxial with the secondary outlet, and
a first curved tube mounted in the secondary outlet by a plurality of o-rings, the first curved tube being sealingly rotatable with respect to the secondary outlet while the meter resetter is subjected to water pressure, and a second curved tube mounted in the secondary inlet by a plurality of o-rings, the second curved tube being sealingly rotatable with respect to the secondary inlet while the meter resetter is subjected to water pressure.

* * * * *